(12) United States Patent  
Lambert et al.

(10) Patent No.: US 9,394,822 B2
(45) Date of Patent: Jul. 19, 2016

(54) EMISSION CONTROL SYSTEM INCLUDING AN OXIDATION CATALYST AND SELECTIVE CATALYTIC REDUCTION CATALYST

(71) Applicant: Ford Global Technologies, LLC, Dearborn, MI (US)

(72) Inventors: Christine Kay Lambert, Dearborn, MI (US); Justin Anthony Ura, Livonia, MI (US); Douglas Allen Dobson, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/942,406

(22) Filed: Jul. 15, 2013

(65) Prior Publication Data
US 2015/0013310 A1 Jan. 15, 2015

(51) Int. Cl.
*F01N 3/20* (2006.01)
*F01N 3/28* (2006.01)
*F01N 3/035* (2006.01)
*F01N 13/00* (2010.01)
*F01N 3/021* (2006.01)
*F01N 3/10* (2006.01)

(52) U.S. Cl.
CPC *F01N 3/28* (2013.01); *F01N 3/035* (2013.01); *F01N 3/208* (2013.01); *F01N 3/2807* (2013.01); *F01N 3/021* (2013.01); *F01N 3/106* (2013.01); *F01N 13/009* (2014.06); *F01N 2570/145* (2013.01); *F01N 2610/02* (2013.01); *F01N 2610/1406* (2013.01); *F01N 2900/1404* (2013.01); *F01N 2900/1602* (2013.01); *Y02C 20/10* (2013.01); *Y02T 10/24* (2013.01)

(58) Field of Classification Search
CPC .......... F01N 3/021; F01N 3/106; F01N 3/208; F01N 13/009; F01N 2570/145; F01N 2610/02; F01N 2610/1406; F01N 2900/1404; F01N 2900/1602
USPC ........... 60/274, 285, 286, 295, 297, 299, 301, 60/311
See application file for complete search history.

(56) References Cited

U.S. PATENT DOCUMENTS

| | | | |
|---|---|---|---|
| 7,229,597 B2 | 6/2007 | Patchett et al. |
| 7,490,464 B2 | 2/2009 | Li et al. |
| 7,767,175 B2 | 8/2010 | Golden et al. |
| 7,902,107 B2 | 3/2011 | Patchett et al. |
| 7,919,051 B2 | 4/2011 | Li et al. |
| 8,038,954 B2 | 10/2011 | Li |
| 8,062,601 B2 | 11/2011 | Cheng et al. |

(Continued)

OTHER PUBLICATIONS

Anonymous, "Reductant Generation for Solid Zeolite SCR/DDF Catalyst," IPCOM No. 000082821, Published Feb. 28, 2005, 2 pages.

*Primary Examiner* — Jorge Leon, Jr.
(74) *Attorney, Agent, or Firm* — Julia Voutyras; Alleman Hall McCoy Russell & Tuttle LLP

(57) ABSTRACT

An emission control system is provided. The emission control system includes an oxidation catalyst having a precious metal loading of less than 100 grams (g)/cubic foot ($ft^3$) and a selective catalytic reduction (SCR) component positioned downstream of the oxidation catalyst operated between 150° C. and 300° C. during engine operation to reduce the formation of $N_2O$ in the selective-catalytic reduction component.

16 Claims, 4 Drawing Sheets

(56) References Cited

U.S. PATENT DOCUMENTS

| | | | |
|---|---|---|---|
| 8,122,603 B2 | 2/2012 | Patchett et al. | |
| 8,148,290 B2 | 4/2012 | Mueller et al. | |
| 8,263,033 B2 | 9/2012 | Dobson et al. | |
| 8,562,925 B2 * | 10/2013 | Sarby | 423/213.2 |
| 8,568,674 B1 * | 10/2013 | Sung et al. | 423/213.2 |
| 2007/0051096 A1 * | 3/2007 | Pfeifer et al. | 60/286 |
| 2010/0005787 A1 * | 1/2010 | Hosoya et al. | 60/286 |
| 2010/0115918 A1 * | 5/2010 | Sawada et al. | 60/276 |
| 2010/0192547 A1 * | 8/2010 | Yabe et al. | 60/286 |
| 2010/0242438 A1 | 9/2010 | Mital | |
| 2010/0281853 A1 * | 11/2010 | Toshioka et al. | 60/276 |
| 2010/0319324 A1 | 12/2010 | Mital | |
| 2011/0030351 A1 * | 2/2011 | Kato | 60/297 |
| 2011/0113761 A1 * | 5/2011 | Boorse et al. | 60/297 |
| 2011/0120093 A1 * | 5/2011 | Eckhoff et al. | 60/274 |
| 2011/0162349 A1 | 7/2011 | Cheng et al. | |
| 2011/0173950 A1 * | 7/2011 | Wan et al. | 60/274 |
| 2011/0206584 A1 | 8/2011 | Dobson et al. | |
| 2012/0214663 A1 | 8/2012 | Chigapov et al. | |
| 2013/0006504 A1 * | 1/2013 | Schreurs | 701/108 |
| 2013/0180231 A1 * | 7/2013 | Miao et al. | 60/297 |
| 2014/0000246 A1 * | 1/2014 | Hosoya et al. | 60/286 |
| 2014/0230408 A1 * | 8/2014 | Gonze et al. | 60/274 |

\* cited by examiner

EMISSION CONTROL SYSTEM INCLUDING AN OXIDATION CATALYST AND SELECTIVE CATALYTIC REDUCTION CATALYST

FIELD

The present disclosure relates to an emission control system in a vehicle including an oxidation catalyst and a selective catalytic reduction (SCR) catalyst.

BACKGROUND AND SUMMARY

Emission control devices are used in vehicles to reduce emissions, thereby reducing a vehicle's environmental impact. Catalysts such as selective catalytic reduction (SCR) catalysts may be utilized in vehicles to achieve this emissions reduction. Additional emission control devices which may be utilized in vehicles include oxidation catalysts, particulate filters, 3-way catalysts, etc. Diesel engines may generate a large amount nitrous oxide ($N_2O$) and other nitrogen compounds which may have a particularly long life in the atmosphere. Thus, the nitrogen compounds, such as $N_2O$, generated in engines may be of particular environmental concern and therefore may be regulated for both commercial and non-commercial vehicles.

U.S. Pat. No. 7,767,175 discloses an after-treatment system having a selective catalytic reduction (SCR) catalyst positioned upstream of a diesel oxidation catalyst (DOC) where ignition temperature in the system is reduced to reduce emissions. However, the inventors have recognized several drawbacks with the after-treatment system disclosed in U.S. Pat. No. 7,767,175. For instance, the after-treatment system may generate a large amount of nitrogen compounds, such as nitrous oxide, due to the positioning of the DOC downstream of the SCR catalyst and the interaction between the two components. Moreover, the material composition of the DOC may also contribute to the increased generation of nitrogen compounds such as $N_2O$.

The inventors have recognized the aforementioned drawbacks of previous emission control systems and have developed an emission control system including an oxidation catalyst having a precious metal loading of less than 100 grams (g)/cubic foot ($ft^3$) and a selective catalytic reduction (SCR) component positioned downstream of the oxidation catalyst operated between 150° C. and 300° C. during engine operation to reduce the formation of $N_2O$ in the selective-catalytic reduction component.

It has been unexpectedly found that holding the SCR catalyst with the recited temperature range and providing the recited amount of a precious metal loading in the oxidation catalyst upstream of the SCR catalyst work in conjunction to reduce the emissions from the emission control system. Specifically, the following reaction may take place in the SCR catalyst,

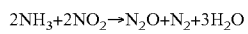

When the oxidation catalyst is loaded with less than 100 g/$ft^3$ with precious metals the amount of nitrogen oxide ($NO_2$) is reduced, thereby reducing the formation of nitrous oxide in the SCR catalyst. Moreover, maintaining the SCR catalyst temperature within the recited temperature range further reduces the amount of nitrous oxide formation in the SCR catalyst. In this way, emissions from the emission control system are reduced, thereby reducing the vehicle's environmental impact. Therefore, it will be appreciated that the technical results achieved via the aforementioned emission control system include emissions reduction via the interaction between the oxidation catalyst and the SCR catalyst.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

An emission control system is described herein. The emission control system includes an oxidation catalyst positioned upstream of a selective catalytic reduction (SCR) catalyst. It has been unexpectedly found that when the precious metal loading on the oxidation catalyst is less than 100 g/$ft^3$ and the temperature operating range of the SCR catalyst is between 150° C. and 300° C. a dramatic reduction in nitrogen compound emissions is achieved. Specifically, nitrous oxide emissions are substantially reduced. It has been found that the following reaction takes place in the SCR catalyst,

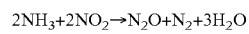

The aforementioned precious metal loading on the oxidation catalyst reduces the amount of nitrogen dioxide flowed to the SCR catalyst. Therefore, when the amount of nitrogen dioxide provided to the SCR catalyst is reduced the amount of nitrous oxide generated in the SCR catalyst is reduced according to the equation above. Operating the SCR catalyst within the temperature range between 150° C. and 300° C. further reduces the amount of nitrous oxide generated in the SCR catalyst. Consequently, the vehicle's environmental impact is reduced. The $N_2O$ generated by the SCR catalyst may be reduced when the vehicle exhaust temperatures range from 175° C. to 700° C. when there is no $NO_2$ feeding into the catalyst and all the $NO_x$ is in the form of NO. When $NO_2$ is present at a level up to 50% of the incoming $NO_x$, the formation of $N_2O$ is reduced (e.g., minimized) between about 200° C. and 300° C.

Figure 1:
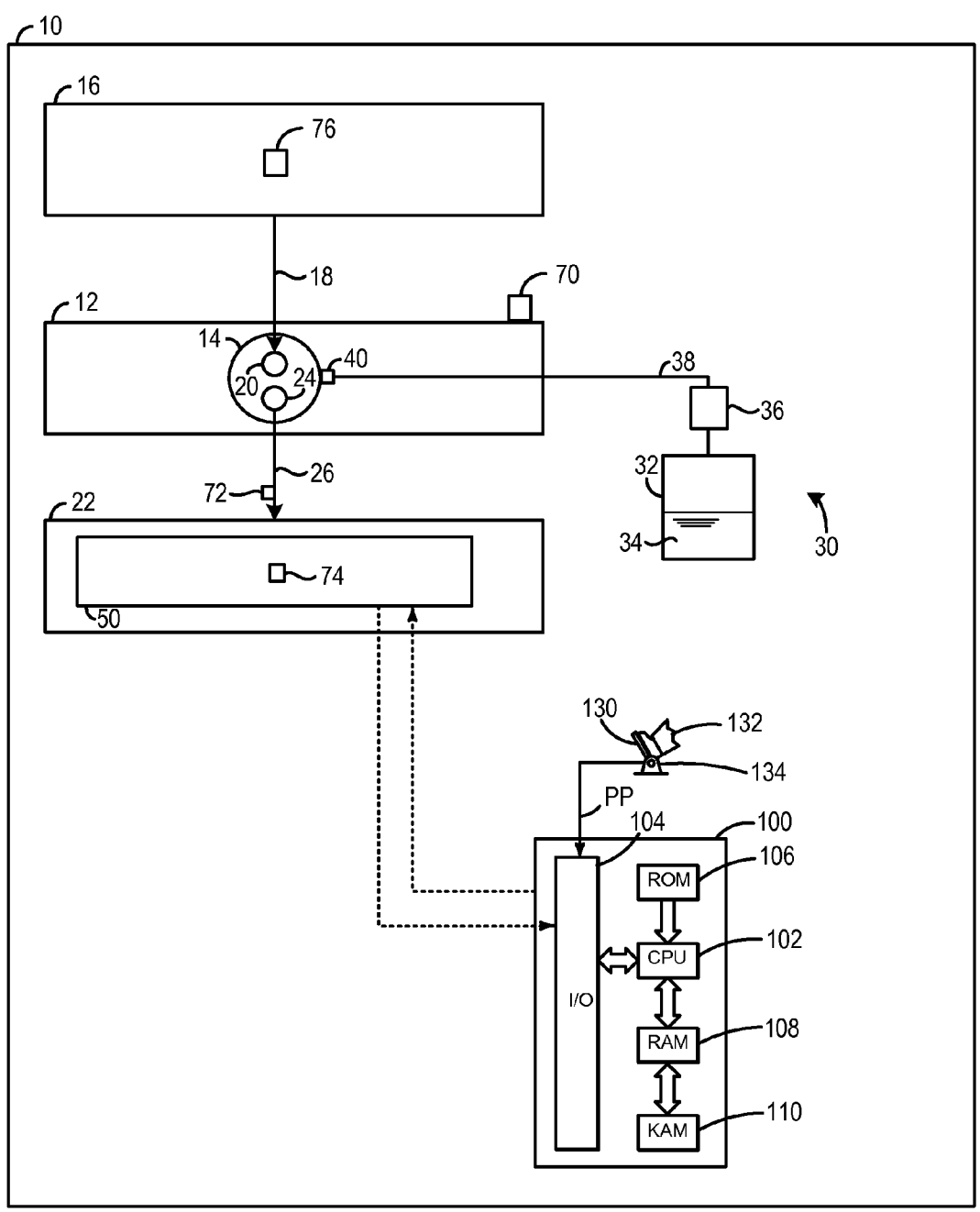
FIG. 1 shows a schematic depiction of a vehicle including an engine and an emission control system.

FIG. 1 shows a schematic depiction of a vehicle 10 including an engine 12. The engine 12 is configured to implement combustion operation. For example, a four stroke combustion cycle may be implemented including an intake stroke, a compression stroke, a power stroke, and an exhaust stroke. However, other types of combustion cycles may be utilized in other examples. In this way, motive power may be generated in the vehicle 10. It will be appreciated that the engine may be coupled to a transmission for transferring rotation power generated in the engine to wheels in the vehicle.

The engine 12 includes at least one cylinder 14. However, engines having different cylinder configurations have been contemplated. For instance, the cylinder may be arranged in an inline configuration where the cylinders are positioned in a straight line, a horizontally opposed configuration, a V-configuration, etc.

An intake system 16 is configured to provide air to the cylinder 14. The intake system 16 may include a variety of components for achieving the aforementioned functionality such as a throttle, an intake manifold, compressor, intake conduits, etc. As shown, the intake system 16 is in fluidic communication with the cylinder 14, denoted via arrow 18. It will be appreciated that one or more conduits, passages, etc., may provide the fluidic communication denoted via arrow 18. An intake valve 20 included in the intake system 16 may provide the fluidic communication between the intake system and the cylinder. The intake valve 20 may be cyclically opened and closed to implement a combustion operation in the engine.

A fuel delivery system 30 is also provided in the vehicle 10. The fuel delivery system 30 includes a fuel tank 32 configured to store a liquid fuel 34 such as diesel, gasoline, alcohol, or a combination thereof. The fuel delivery system 30 includes a fuel pump 36 in a fuel line 38. The fuel delivery system 30 further includes a fuel injector 40. The fuel injector 40 is shown directly coupled to the cylinder 14 to provide what is known as direct fuel injection. Additionally or alternatively, the fuel delivery system may include a port fuel injector configured to deliver fuel at a location upstream of the intake valve 20. The fuel delivery system 30 may also include fuel filters, a second fuel pump, etc.

Furthermore, the engine further includes an exhaust system 22 configured to receive exhaust gas from the cylinder 14. The exhaust system may include manifolds, conduits, passages, emission control devices (e.g., catalysts, filters, etc.), mufflers, etc. An exhaust valve 24 coupled to the cylinder 14 is included in the exhaust system 22. The exhaust valve 24 may be configured to cyclically open and close during the combustion operation. The exhaust system 22 is in fluidic communication with the cylinder 14, denoted via arrow 26. Specifically, arrow 26 may indicate exhaust passages, conduits, etc., providing fluidic communication between the cylinder 14 and the exhaust valve 24. The exhaust valve may be configured to cyclically open and close to enable the combustion operation.

The exhaust system 22 may include an emission control system 50. The emission control system 50 may include catalysts, filters, temperature sensor, pressure sensors, exhaust gas composition sensor, etc. The emission control system 50 may be configured to reduce the amount of nitrogen compounds (e.g., nitrous oxide ($N_2O$) in the exhaust gas). As a result, vehicle emissions are reduced, thereby reducing the vehicle's environmental impact. Specifically, the emission control system may include an oxidation catalyst having a precious metal loading of less than a predetermined value and a selective catalytic reduction (SCR) catalyst maintained within a desired temperature range. The loading of the oxidation catalyst and operating the SCR catalyst within a desired temperature range work in conjunction to reduce the amount of nitrogen compounds in the exhaust expelled from the emission control system. An example emission control system 200 is shown in FIG. 2 and discussed in greater detail herein.

A controller 100 may be included in the vehicle. The controller 100 may be configured to receive signals from sensors in the vehicle as well as send command signals to components such as a reductant injector, a throttle, a valve timing adjustment system, the fuel injector 40, etc. Various components in the vehicle 10 may be controlled at least partially by a control system including the controller 100 and by input from a vehicle operator 132 via an input device 130. In this example, input device 130 includes an accelerator pedal and a pedal position sensor 134 for generating a proportional pedal position signal PP. The controller 100 is shown in FIG. 1 as a microcomputer, including processor 102 (e.g., microprocessor unit), input/output ports 104, an electronic storage medium for executable programs and calibration values shown as read only memory 106 (e.g., read only memory chip) in this particular example, random access memory 108, keep alive memory 110, and a data bus. Storage medium read-only memory 106 can be programmed with computer readable data representing instructions executable by processor 102 for performing the methods described below as well as other variants that are anticipated but not specifically listed.

The vehicle 10 further includes a heat exchanger 70 coupled to the engine 12. The heat exchanger 70 is configured to remove heat from the engine. The vehicle 10 may further include a post injector 72 coupled to an exhaust stream downstream of the exhaust valve 24. The post injector 72 is configured to provide fuel to the exhaust stream at selected intervals to adjust the temperature components in the exhaust system. An electrical heater 74 may also be included in the emission control system 50. The electric heater 74 is configured to provide heat to one or more components in the emission control system. The electrical heater 74 may be coupled to an SCR catalyst, in one example. A throttle 76 is also shown included in the intake system 16. The throttle 76 is configured to adjust the amount of intake airflow provided to the cylinder.

Figure 2:
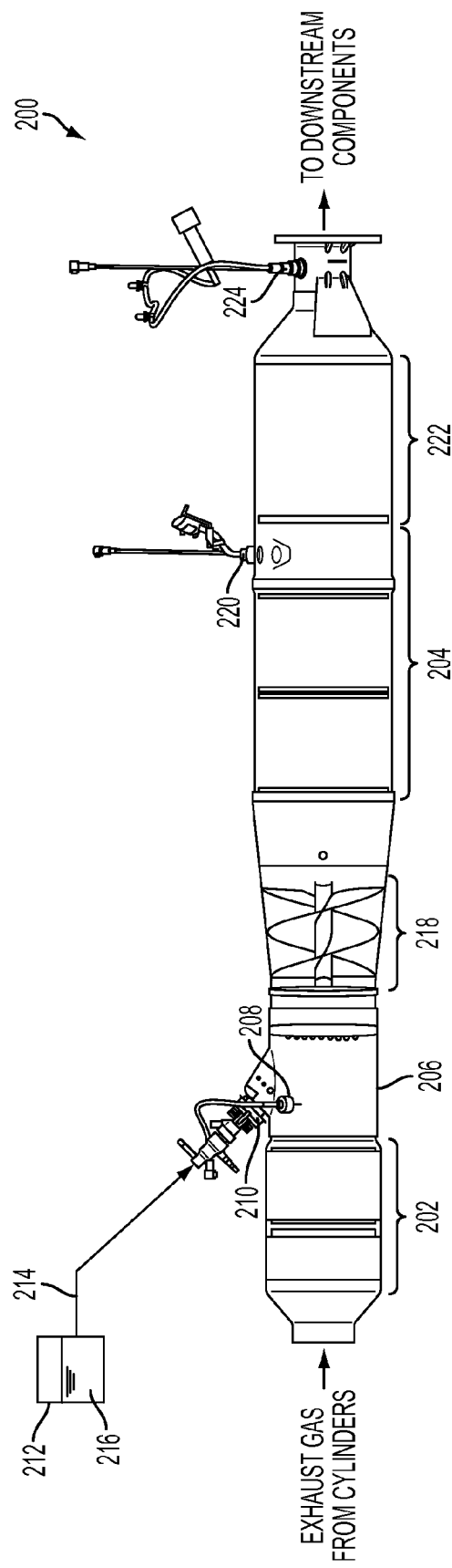
FIG. 2 shows an example emission control system.

A detailed view of an example emission control system 200 is shown in FIG. 2. The emission control system 200 has an oxidation catalyst 202. The oxidation catalyst 202 may be a diesel oxidation catalyst (DOC) in one example. The oxidation catalyst 202 may include precious metals such as palladium (Pd) and/or platinum (Pt). The amount of one or more of the aforementioned precious metals (e.g., Pd and/or Pt) may be limited in the oxidation catalyst 202 to reduce the amount of nitrogen dioxide generated in the oxidation catalyst. In one example, the one or more of the precious metals, such as platinum (Pt) and/or palladium (Pd), may be limited to less than 100 $g/ft^3$ or 75 $g/ft^3$ of loading in the oxidation catalyst. The DOC may also contain support materials such as aluminum oxide and hydrocarbon storage materials such as zeolite. The precious metals may be zoned or layered in some cases for improved functionality, such as a Pt rich front zone or top layer to remove hydrocarbons and carbon monoxide, followed by a Pd rich rear zone or bottom layer to further remove remaining hydrocarbons and carbon monoxide. Further, in one example the oxidation catalyst may not include any platinum. Thus, the only precious metal in the oxidation catalyst may be palladium. This loading may reduce emission of ($N_2O$) in a downstream SCR catalyst 204, discussed in greater detail herein. As shown, the oxidation catalyst 202 receives exhaust gas from a cylinder in an engine, such as the cylinder 14, shown in FIG. 1. The exhaust gas is then flowed through the oxidation catalyst 202. Then the exhaust gas is flowed into a conduit section 206 directly coupled to the oxidation catalyst 202. A temperature sensor 208 is coupled to the conduit section 206 upstream of the SCR catalyst 204 and the oxidation catalyst 202. The temperature sensor 208 is configured determine the temperature of the exhaust gas in the conduit section 206. The temperature sensor 208 may send a temperature sensor signal to a controller, such as the controller 100 shown in FIG. 1.

A reductant injector 210 is also coupled to the conduit section 206. The reductant injector 210 is configured to spray a suitable reductant into the conduit section 206, downstream of the oxidation catalyst 202 and upstream of the SCR catalyst 204. The reductant may generate a desired chemical reaction in downstream components (e.g., the SCR catalyst). The reductant injector 210 is in fluidic communication with a reductant storage tank 212 indicated via arrow 214. One or more conduits, channels, etc., may be used to provide the aforementioned fluidic communication. A suitable reductant 216 may be stored in the reductant storage tank 212 such as urea (e.g., aqueous urea), ammonia (e.g., aqueous ammonia), etc.

A mixer 218 is positioned downstream of the reductant injector 210. The mixer 218 is configured to mix the exhaust gas with the reductant sprayed from the injector, to increase the distribution of the reductant in the exhaust gas. In some examples, the mixer 218 may include two helically aligned surfaces to provide this mixing.

The SCR catalyst 204 is positioned downstream of the mixer 218. The SCR catalyst may include Cu or Fe containing zeolite. For example, zeolite may be a small pore zeolite such as chabazite that does not retain hydrocarbons to any great extent within its structure but allows ammonia and NOx to react on its active sites. A sensor 220 may be coupled to the SCR catalyst 204. The sensor 220 may be a pressure and/or temperature sensor. The sensor 220 may be in electronic communication with a controller, such as controller 100 shown in FIG. 1. It has been unexpectedly found that the following reaction may take place in the SCR catalyst 204. $2NH_3 + 2NO_2 \rightarrow N_2O + N_2 + 3H_2O$ Therefore, when the amount of nitrogen dioxide provided to the SCR catalyst is reduced via limiting the amount of precious metal loading in the oxidation catalyst to less than 100 g/ft$^3$ the amount of nitrous oxide generated in the SCR catalyst is reduced, thereby reducing emissions from the emission control system. Further in one example, the SCR catalyst may be maintained between 150° C. and 300° C. Maintaining the SCR catalyst within this temperature range may further reduce nitrous oxide generation in the emission control system. The $N_2O$ generated by the SCR catalyst may be the lowest at all vehicle exhaust temperatures from 175° C. to 700° C. when there is no $NO_2$ feeding into the catalyst and all the NO is in the form of NO. When $NO_2$ is present at a level up to 50% of the incoming $NO_R$, the formation of $N_2O$ is reduced (e.g., minimized) between about 200° C. and 300° C. Therefore, maintaining the SCR catalyst between 150° C. and 300° C. reduces the formation of $N_2O$. Further in some examples, the SCR catalyst may be maintained between 175° C. and 225° C. Maintaining the SCR catalyst within this temperature range further reduces nitrous oxide generation in the emission control system.

A particulate filter 222 is positioned downstream of the SCR catalyst 204. The particulate filter 222 is configured to remove unwanted particulates from the exhaust gas flowing therethrough. A sensor 224 is coupled to an exhaust conduit downstream of the particulate filter 222. The sensor 224 may be an exhaust gas composition sensor such as nitrogen oxide sensor and/or a temperature sensor. The sensor 224 may be in electronic communication with a controller, such as controller 100, shown in FIG. 1. Thus, the sensor 224 may send signals to the controller.

Components which may be adjusted to maintain a desired SCR catalyst operating temperature may include the heat exchanger 70 coupled to the engine 12 shown in FIG. 1, the post fuel injector 72 shown in FIG. 1, the electrical heater 74 shown in FIG. 1, the valves (20 and 24) shown in FIG. 1 when the engine is configured with variable valve timing, the throttle 76 included in the intake system 16 shown in FIG. 1 may also be adjusted. The engine's duty cycle and/or cylinder deactivation may also be adjusted to maintain a desired SCR operating temperature, where a subset of cylinders may be deactivated responsive to the SCR temperature. Furthermore, the size of the catalyst, the catalyst configuration, and/or the power/weight ratio of the engine may be selected to help achieve desired SCR catalyst operating temperature (e.g., between 175° C. and 225° C.).

It will be appreciated that one or more of the aforementioned sensors may be used to implement a feedback type control strategy for SCR catalyst temperature adjustment. For instance, a temperature indication signal from a temperature sensor coupled to the SCR catalyst or the conduit directly upstream of the conduit may be received by a controller and the controller may subsequently adjust a component such as the reductant injector based on the temperature indicated via the sensor.

Figure 3:
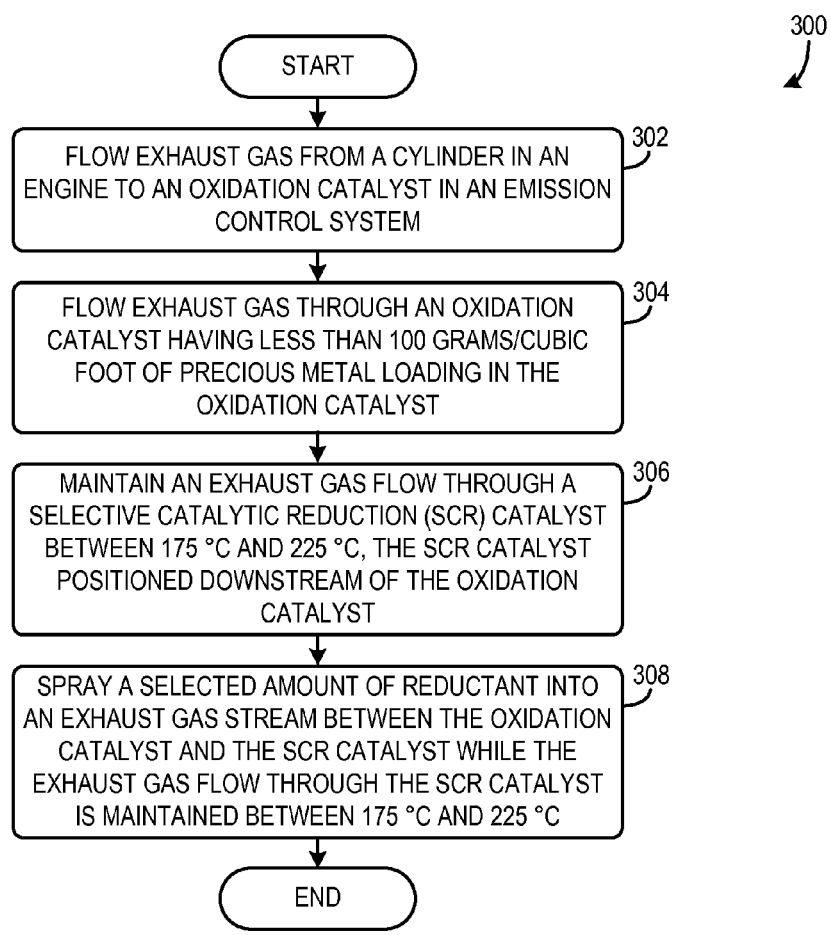
FIGS. 3 and 4 show a method for operation of an emission controls system for an engine.

FIG. 3 shows a method 300 for operation of an emission control system for an engine. The method 300 may be implemented via the emission control system discussed above with regard to FIGS. 1-2 or may be implemented via another suitable emission control system.

At 302 the method includes flowing exhaust gas from a cylinder in an engine to an oxidation catalyst in an emission control system. Next at 304 the method includes flowing exhaust gas through an oxidation catalyst having less than 100 grams (g)/cubic foot (ft$^3$) of precious metal loading in the oxidation catalyst. In one example, the precious metal includes platinum. In another example, the precious metal includes palladium.

At 306 the method includes maintaining an exhaust gas flow through a selective catalytic reduction (SCR) catalyst between 175° C. and 225° C., the SCR catalyst positioned downstream of the oxidation catalyst. At 308 the method includes adjusting an amount of reductant sprayed into an exhaust gas stream between the oxidation catalyst and the SCR catalyst. It will be appreciated that adjusting an amount of reductant sprayed into the exhaust gas stream may include increasing the amount of reductant sprayed into the exhaust gas stream. Furthermore, maintaining the SCR catalyst between 175° C. and 225° C. may include one or more of adjusting a heat exchanger coupled to the engine, adjusting the engine's duty cycle, an electric heater in the emission control system, adjusting an amount of post injected fuel in the engine, adjusting an amount of fuel injection in the engine, adjusting a throttle position in the engine, adjusting intake valve timing in the engine, and adjusting exhaust valve timing in the engine. The size of the catalyst, the catalyst configuration, and/or the power/weight ratio of the engine may be selected to help achieve desired SCR catalyst operating temperature (e.g., between 175° C. and 225° C.).

Figure 4:
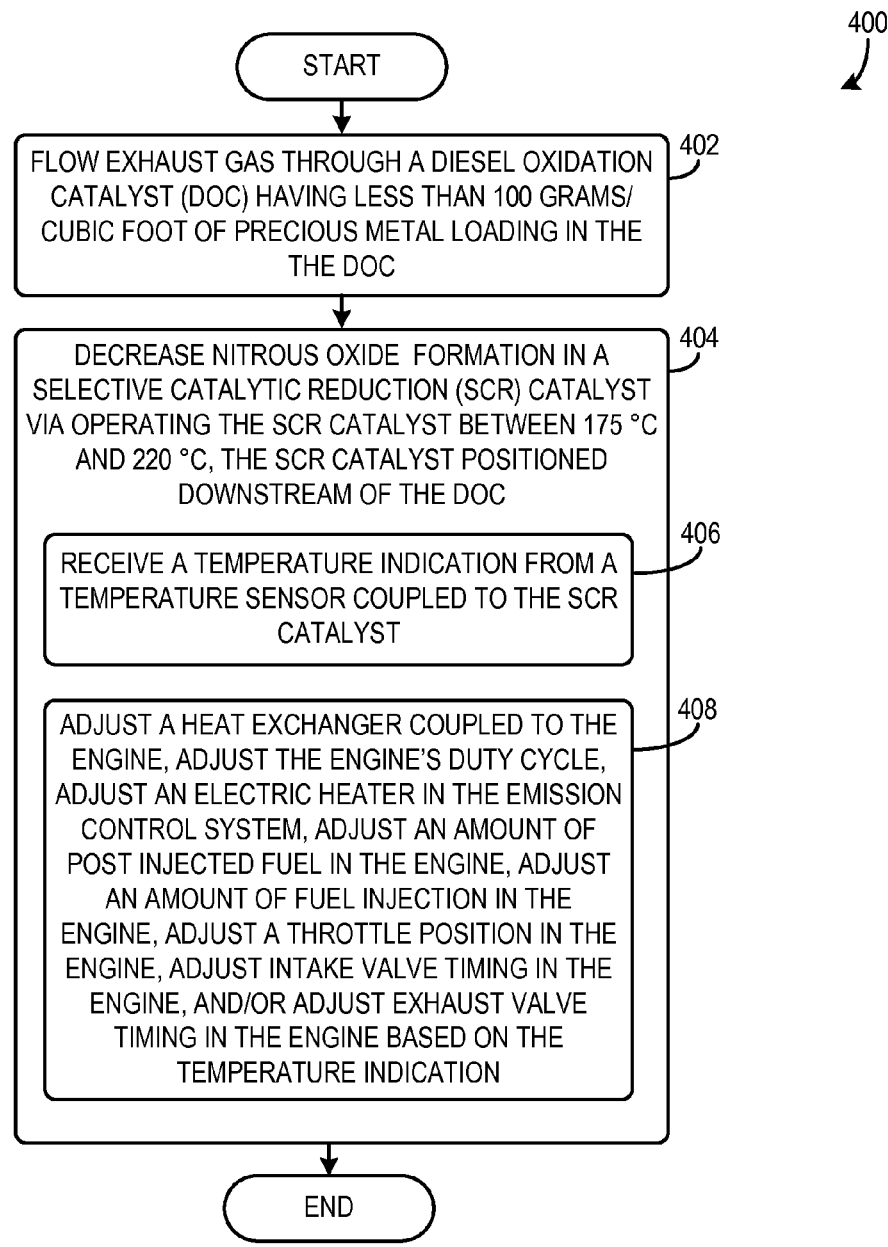

FIG. 4 shows a method 400 for operation of an emission control system for an engine. The method 400 may be implemented via the emission control system discussed above with regard to FIGS. 1-2 or may be implemented via another suitable emission control system.

At 402 the method includes flowing exhaust gas through a diesel oxidation catalyst (DOC) having less than 100 grams (g)/cubic foot (ft$^3$) of precious metal loading in the DOC. Specifically in one example, the precious metal loading of the DOC is less than 75 g/ft$^3$. Moreover, as previously discussed the precious metal may include platinum and/or palladium. Specifically, in one example the precious metal may only comprise palladium. Next at 404 the method includes decreasing nitrous oxide $N_2O$ formation in a selective catalytic reduction (SCR) catalyst via operating the SCR catalyst between 175° C. and 220° C., the SCR catalyst positioned downstream of the DOC. In one example, the formation of $N_2O$ in the SCR catalyst is less than 10 milligrams (mg)/mile (mi). Additionally, decreasing nitrous oxide $N_2O$ formation in the selective catalytic reduction (SCR) catalyst may include at 406 receiving a temperature indication from a temperature sensor coupled to the SCR catalyst. Decreasing nitrous oxide ($N_2O$) formation in the selective catalytic reduction (SCR) catalyst may also include at 408 one or more of adjusting a heat exchanger coupled to the engine, adjusting the engine's duty cycle, adjust an electric heater in the emission control system, adjusting an amount of post injected fuel in the engine, adjusting an amount of fuel injection in the engine, adjusting a throttle position in the engine, adjusting intake valve timing in the engine, and adjusting exhaust valve timing in the engine based on the temperature indication.

It will be appreciated that the aforementioned components may be adjusted based on the temperature sensor indication. In this way, the temperature of the SCR catalyst may be maintained within a desired temperature range and the DOC has a precious metal loading of less than a predetermined value to reduce the amount of nitrogen compounds generated in the emission control system, thereby reducing emissions from the vehicle in which the emission control system is included. Further, when no $NO_2$ is present at the SCR in the exhaust (e.g., $NO_2$ levels are below a minimum threshold), urea or ammonia can be dosed across the entire temperature range of 175 to 700° C. without forming excessive $N_2O$. As such, the ammonia dosing may be adjusted responsive to not only temperature, but also $NO_2$ presence, or a level thereof, in the exhaust, with the ammonia dosing enabled across a greater temperature range with lower $NO_2$ levels. Conversely, at higher $NO_2$ levels, the ammonia dosing may be limited or restricted to only a smaller temperature range, in order to reduce $N_2O$ generation.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An emission control system coupled to an engine, comprising:
   an oxidation catalyst having a precious metal loading of less than 75 grams (g)/cubic foot ($ft^3$);
   a selective catalytic reduction (SCR) catalyst positioned downstream of the oxidation catalyst and maintained between 175° C. and 225° C. during engine operation to reduce formation of $N_2O$ in the SCR catalyst; and
   a reductant injector positioned between the oxidation catalyst and the SCR catalyst, where an amount of reductant injected into an exhaust stream between the oxidation catalyst and the SCR catalyst via the reductant injector is increased while the SCR catalyst is operated between 175° C. and 225° C.

2. The emission control system of claim 1, where the precious metal comprises platinum (Pt).

3. The emission control system of claim 1, where the precious metal comprises only palladium (Pd).

4. The emission control system of claim 1, where the reductant injector is in fluidic communication with a reductant reservoir storing ammonia.

5. The emission control system of claim 1, further comprising a diesel particulate filter positioned downstream of the SCR catalyst.

6. The emission control system of claim 1, where the precious metal includes platinum (Pt) and palladium (Pd).

7. The emission control system of claim 1, wherein formation of $N_2O$ is reduced when $NO_2$ is present at a level of up to 50% of incoming NOx while the SCR catalyst is maintained between 175° C. and 225° C.

8. A method for operation of an emission control system for an engine comprising:
   flowing exhaust gas through an oxidation catalyst having less than 75 grams (g)/cubic foot ($ft^3$) of precious metal loading in the oxidation catalyst and reducing an amount of $NO_2$; and
   maintaining an exhaust gas flow through a selective catalytic reduction (SCR) catalyst between 175° C. and 225° C., the SCR catalyst positioned downstream of the oxidation catalyst.

9. The method of claim 8, further comprising spraying a selected amount of reductant into an exhaust gas stream between the oxidation catalyst and the SCR catalyst responsive to the reduced amount of $NO_2$ present while the exhaust gas flow through the SCR catalyst is maintained between 175° C. and 225° C.

10. The method of claim 8, where maintaining the exhaust gas flow through the SCR catalyst between 175° C. and 225° C. includes one or more of adjusting a heat exchanger coupled to the engine, adjusting an engine duty cycle, adjusting an electric heater in the emission control system, adjusting an amount of post injected fuel in the engine, adjusting an amount of fuel injection in the engine, adjusting a throttle position in the engine, adjusting intake valve timing in the engine, and adjusting exhaust valve timing in the engine.

11. The method of claim 8, where the precious metal includes platinum (Pt).

12. The method of claim 8, where the precious metal includes only palladium (Pd).

13. A method of operation of an emission control system comprising:

flowing exhaust gas through a diesel oxidation catalyst (DOC) having less than 75 grams (g)/cubic foot ($ft^3$) of precious metal loading and decreasing an $NO_2$ amount; and decreasing nitrous oxide $N_2O$ formation in a selective catalytic reduction (SCR) catalyst in response to a condition via maintaining the SCR catalyst between 175° C. and 220° C., the SCR catalyst positioned downstream of the DOC.

14. The method of claim 13, where formation of $N_2O$ in the SCR catalyst is less than 10 milligrams (mg)/mile (mi), and wherein the condition is an amount of ammonia stored in the SCR catalyst.

15. The method of claim 13, where operating the SCR catalyst between 175° C. and 220° C. includes one or more of adjusting a heat exchanger coupled to an engine, adjusting an engine duty cycle, adjusting an electric heater in the emission control system, adjusting an amount of post injected fuel in the engine, adjusting an amount of fuel injection in the engine, adjusting a throttle position in the engine, adjusting intake valve timing in the engine, and adjusting exhaust valve timing in the engine.

16. The method of claim 13, where operating the SCR catalyst between 175° C. and 220° C. includes receiving a temperature indication from a temperature sensor coupled to the SCR catalyst and adjusting one or more exhaust system components based on the temperature sensor indication, the one or more exhaust system components including a reductant injector positioned between the DOC and the SCR catalyst.

\* \* \* \* \*